United States Patent Office 3,133,243
Patented May 12, 1964

3,133,243
ENHANCED POLARIZATION NUCLEAR FREE PRECESSION MAGNETOMETER
Georges Bonnet, Grenoble, Isere, Jean Louis Laffon, St.-Egreve, Isere, and Pierre Servoz-Gavin, Grenoble, Isere, France, assignors to Commissariat a l'Energie Atomique, Paris, France, an organization of France
Filed June 29, 1961, Ser. No. 120,694
Claims priority, application France July 18, 1960
3 Claims. (Cl. 324—.5)

The present invention relates to the accurate measurement of weak magnetic fields (lower than approximately 10 gauss or oersteds) and in particular of the earth's total magnetic field (which is equal to about 0.5 gauss) by nuclear induction, that is to say by determination of the free precession frequency of a system of subatomic particles or atom portions, in particular of atomic nuclei, in the magnetic field to be measured, this frequency being, for reasons hereinafter indicated, strictly proportional to the intensity of this field.

As a matter of fact, being given a sample consisting of a system of nuclear spins or atomic nuclei having an intrinsic angular momentum or spin $\bar{r}$ (vectors being represented in the present description by a letter with a bar above it) and a magnetic moment $\bar{m}$, both of these quantities being different from zero, so that these nuclei have a gyromagnetic ratio $$\gamma = \frac{\bar{m}}{\bar{r}}$$

which is well determined and different from zero, this sample has, when placed in a magnetic field $\bar{H}$ of intensity H, a resultant magnetic moment or macroscopic magnetization vector $\bar{M}$ which, when the thermal equilibrium is established between the atomic nuclei and the surrounding medium, is given by the formula:

$$\bar{M} = X\bar{H}$$

in which X is the (nuclear) magnetic susceptibility of the system of atomic nuclei (the nuclear magnetic susceptibility being, as it is known, much smaller than the paramagnetic susceptibility of electrons).

In order to obtain free precession of the resultant macroscopic magnetization vector $\bar{M}$ about the direction of the field $\bar{H}$, it has been proposed, in the U.S. patent to Russel H. Varian, No. 2,561,490 of July 24, 1951, assigned to the firm "Varian Associates" (now Reissue No. 23,769 of January 12, 1954), and in a publication by G. S. Waters and P. D. Francis entitled "A Nuclear Magnetometer" and published in the "Journal of Scientific Instruments," vol. 35 (1958), pp. 88–93, to subject for a certain time atomic nuclei to a polarizing auxiliary magnetic field $\bar{P}$ making a certain angle with the field $\bar{H}$ to be measured (in the French Patent No. 1,210,465 of the firm Varian Associates, delivered September 28, 1959, it is indicated that, in the case of the measurement of the earth magnetic field with protons acting as atomic nuclei, a biasing field of about 100 gauss is applied for about three seconds in a direction substantially perpendicular to that of the earth field). Under the combined effects of this polarizing field $\bar{P}$ and of the field $\bar{H}$ to be measured, the macroscopic magnetization $\bar{M}$ quickly assumes the direction of the total magnetic field $\bar{R} = \bar{H} + \bar{P}$ (which is approximately perpendicular to the field $\bar{H}$ to be measured when the polarizing field is substantially perpendicular thereto) and, after some time (depending upon the longitudinal relaxation time or spin-lattice relaxation time $T_1$, that is to say upon the time taken by the atomic nuclei to reach equilibrium), an intensity much higher determined by $\bar{M}_R = X\bar{R}$. If the polarizing field $\bar{P}$ is suddenly cancelled or cut off, so that only the field $\bar{H}$ to be measured remains, the macroscopic magnetization vector $\bar{M}$ of the atomic nuclei (which was aligned with the direction of the resultant field $\bar{R}$ and which has not been able to align itself with $\bar{H}$ instantaneously after the sudden cancellation of $\bar{P}$) will have a precession movement about direction $\bar{H}$ under the effect of the nuclear angular momentum and of the torque resulting from the interaction between the nuclear magnetic moment and the magnetic field $\bar{H}$ (in the same manner as a rotating gyroscope subjected to the action of the gravity torque) and this until its new orientation along $\bar{H}$ is reached, upon thermal equilibrium, after some time.

The rotating field, associated with the precession of the resultant magnetization vector $\bar{M}$, induces, in a coil surrounding the sample which contains the nuclear spins and disposed in suitable manner (this coil serving generally also to produce the polarizing field $\bar{P}$), an alternating electromotive force of a frequency equal to the frequency $f$, called Larmor frequency, of the free nuclear precession motion, frequency given by the conventional formula $$f = \frac{\gamma}{\pi} H$$

It will therefore be seen that the frequency of the induced alternating electromotive force is strictly proportional to H, the proportionality coefficient being known with an approximation of $10^{-5}$ for protons (which is an excellent accuracy for the absolute measurement) and being further constant (which ensures a still better relative accuracy).

Therefore a nuclear induction magnetic field measurement device, or nuclear magnetometer, of the known type essentially comprises a vessel filled with water (which is a substance containing protons), a coil surrounding this vessel and arranged in use with its axis substantially perpendicular to the field $\bar{H}$ to be measured, a source of direct current, an amplifier associated with a system for measuring the frequency of the amplified oscillations and a switch for alternatively connecting said coil with said source to produce the polarizing field $\bar{P}$ inside said vessel and to said amplifier to permit amplification and measurement of the frequency of the alternating electromotive force induced in the coil by the free precession of the protons of water (previously polarized) after the polarizing field has been cut off in a sudden manner.

It will be noted that the auxiliary or polarizing field $\bar{P}$ has two effects in such prior art nuclear magnetometers:

It increases the resultant magnetization (which becomes proportional to the total magnetic field $\bar{R}$ when passing from $\bar{M} = X\bar{H}$ to $\bar{M}_R = X\bar{R}$) and therefore increases the useful signal and consequently the signal to noise ratio (so that the magnetic field is measured in a particularly accurate manner);

It brings the resultant magnetization $\bar{M}$ out of alignment with the field $\bar{H}$ to be measured so as to ensure, after the polarizing field $\bar{P}$ is cut off, free precession of the nuclear spins about the direction of $\bar{H}$ at a frequency proportional to the intensity of the field H to be measured.

Now there is another method for increasing nuclear polarization, and therefore the nuclear signal, in a weak magnetic field of given value, this method (described in the Belgian Patent No. 566,137, issued on September 27, 1958, to the French Commissariat à l'Energie Atomique and to a part of which corresponds French Patent No. 1,174,136, issued on November 3, 1958, to same Commissariat à l'Energie Atomique) consisting in making use, as measurement sample, of a solution containing, on the one hand in the solvent, atomic nuclei having a well determined gyromagnetic ratio different from zero and, on the other hand dissolved in this solvent, a paramagnetic substance (that is to say a substance comprising in its structure an unpaired electron) having a spectrum of hyperfine structure including a saturable electronic resonance line or band, the mean frequency of which does not approach zero in a magnetic field the intensity of which decreases toward zero (splitting of the energy levels in a field equal to zero) and in saturating by a high frequency field this electronic resonance line of a frequency substantially constant and different from zero in the weak magnetic fields (smaller than about 10 gauss), which has for its effect, by coupling between the magnetic moment of the atomic nuclei of the solvent and the magnetic moment of the electrons of the paramagnetic substance, to impart to the resultant macroscopic moment of the nuclei a high value, even in a weak magnetic field. It is thus possible to obtain in the earth field a polarization about 4000 times more intensive than in the absence of this coupling between unpaired electrons of the dissolved paramagnetic substance and atomic nuclei of the solvent, this action being sometimes called "Overhauser-Abragam effect." A similar, also less large, nuclear polarization by saturation of the electron spin resonance is disclosed in an article of L. H. Bennett and H. C. Torrey entitled "High Negative Nuclear Polarizations in a Liquid" and published in the "Physical Review," vol. 108 (1957), pp. 499–500, the theoretical reasons the interactions between pairs of like or unlike spins being discussed in a paper by I. Solomon entitled "Relaxation Processes in a System of Two Spins," published by the "Physical Review," vol. 99 (1955), pp. 559–565.

It had been found that in the measurement of a weak magnetic field by nuclear induction, the addition of a paramagnetic substance of the above mentioned type in the state of dissolution in the liquid measurement sample, consisting generally of water, and the saturation of an electronic line of this substance in the field forming the resultant of this magnetic field and of the polarizing field, made it possible considerably to reduce the intensity of the polarizing field P, which then had only to produce the second of the above mentioned effects, to wit to induce a free precession of the nuclear spins of the solvent. It was thus possible, in order to measure the earth magnetic field, to apply a polarizing field of the same order of magnitude as this earth field: for instance a polarizing field of an intensity equal to one or several times (for instance from 5 to 6 times) that of the earth field. This very important improvement in the measurement of weak magnetic fields by nuclear induction was disclosed in the French Patent No. 1,221,637 delivered on January 18, 1960, to the French Commissariat à l'Energie Atomique. In this last mentioned patent it was indicated that when the paramagnetic substance consists of potassium nitrosodisulfonate, the polarizing field was applied for about two seconds, at the same time as the high frequency field for saturation of the electronic line, the polarizing field being of course cut off in a sudden manner so as to prevent the nuclear spins from having time to follow the displacement of the resultant field $\overline{R}$ during the decrease of the polarizing field $\overline{P}$. The method disclosed in that patent made it possible considerably to reduce the intensity of the polarizing magnetic field P and therefore the consumption of energy and the dimensions of the apparatus.

Now it has been found unexpectedly that the addition to the liquid sample of a paramagnetic substance of the above mentioned type and the saturation of an electronic resonance line of this substance made it possible not only to reduce the intensity of the auxiliary polarizing magnetic field but also considerably to reduce the duration of application of this polarizing field, for instance from a value of about two or three seconds (as stated in the above mentioned French Patents No. 1,210,465 and No. 1,221,637) to a value of the order of magnitude of the nuclear Larmor period ($T = 1/f$) in the magnetic field $\overline{H}$, which duration may be as low as from 0.25 to 0.5 time said period (which itself is of the order of magnitude of 0.5 millisecond for protons in the earth field of 0.5 gauss). It is thus possible to reduce to a fraction of a millisecond (or to some milliseconds) the duration of application of the polarizing field which in the prior art was of the order of magnitude of one second, so that this value is now divided by a factor of the order of magnitude of several thousands (or several hundreds). In view of the fact that the polarizing field must be cut off very quickly, in all nuclear induction measurements, it will be seen that the total time interval extending from the end of the period of determination of the nuclear frequency to the beginning of the next period is considerably reduced, which permits, for the same duration of the determination or measurement period, therefore for a given accuracy, of considerably increasing the rate at which measurements follow one another.

Thus, if the oscillations at the Larmor frequency in the receiver coil (generally combined with the polarizing coil) are counted during two seconds (period of measurement), with the old methods and devices, where the time for establishing the biasing magnetic field was about three seconds, it was possible to make a measurement on every fifth second and therefore twelve measurements per minute.

When applying the above discovery, it is possible to make measurements of two second intervals that is to say thirty measurements per minute.

As a matter of fact, if account is taken of lost times, the effective rate of measurements will be ten measurements and twenty measurements per minute, respectively. These lost times comprise in particular the period (of a portion of a second) which immediately follows the cutting off of the polarizing field and during which it is necessary to dissipate the electric energy of the polarizing coil before being able to branch the amplification unit and the unit for measuring the oscillations, which units would be perturbed and might be damaged by the discharge of this coil after the polarizing current has been cut off. It is thus possible to multiply substantially by two the rate at which successive measurements can be made, which is very advantageous, in particular in the case of geophysical prospecting by means of a nuclear induction magnetometer moving quickly above the ground, for instance carried by a motor car or by an airplane.

The present invention is in fact based upon the unexpected discovery of this possibility of reducing the time of application of the polarizing field in the case where the Overhauser-Abragam effect is being used. It has for its object a method and a device for measuring the intensity of a weak magnetic field (lower than about 10 gauss), and in particular of the earth magnetic field, by means of a solution containing, on the one hand in the solvent, a system of atomic nuclei having a well defined gyromagnetic ratio different from zero and, on the other hand dissolved in this solvent, paramagnetic ions having an unpaired electron which has an electronic resonance line different from zero in a zero field and saturable by a high frequency alternating field.

The method consists in simultaneously producing in said solution a high frequency alternating field of a frequency equal to that of the electronic resonance line of the paramagnetic ions of the solution in the field to be measured and an auxiliary magnetic field the direction of which makes in use a certain angle, preferably close to 90°, with the direction of the magnetic field to be measured and the intensity of which is of the same order of magnitude as that of the magnetic field to be measured (equal to about from one to ten times this magnetic field), in quickly cutting off the application of the auxiliary magnetic field so as to produce a free precession motion of said atomic nuclei in the magnetic field to be measured at a frequency proportional to the product of said gyromagnetic ratio by the intensity of this magnitude field and in measuring the frequency of this precession, this method being characterized in that the duration of application of said auxiliary magnetic field is of the order of magnitude of the Larmor period of said free precession, motion which duration may be as low as from 0.25 to 0.5 times said Larmor precession period, which itself is the reciprocal to the frequency of said precession motion.

The device comprises a vessel containing said solution, means for creating inside this vessel a high frequency alternating field at the frequency of the electronic resonance line of the paramagnetic ions of the solution in the field to be measured, a coil disposed about said vessel and having in use its axis substantially perpendicular to the magnetic field to be measured, a direct current source capable, when it is connected with said coil, of feeding it with a unidirectional current such that there is produced in said solution an auxiliary magnetic field the direction of which makes a certain angle, preferably close to 90°, with the direction of the magnetic field to be measured and the intensity of which is of the same order of magnitude as that of the magnetic field to be measured, means capable, when they are connected with said coil, of dissipating the energy resulting from the stopping of said current, means capable of determining, when they are connected with said coil, the frequency of the alternating electromotive force induced in said coil by the free precession of said atomic nuclei in the magnetic field to be measured and which is proportional to the product of said gyromagnetic ratio by the intensity of this magnetic field and switching means for connecting said coil first with said source of current, then quickly with said means capable of dissipating the energy and finally with said means capable of determining the frequency, this device being characterized by the fact that it comprises means for controlling the connection through said switching means of said coil with said current source for a duration of the order of magnitude of said Larmor precession period, which duration may be as low as from 0.25 to 0.5 times said Larmor precession period.

Preferred embodiments of the present invention will be hereinafter described with reference to the appended drawings, given merely by way of example, and in which.

Figure 1:
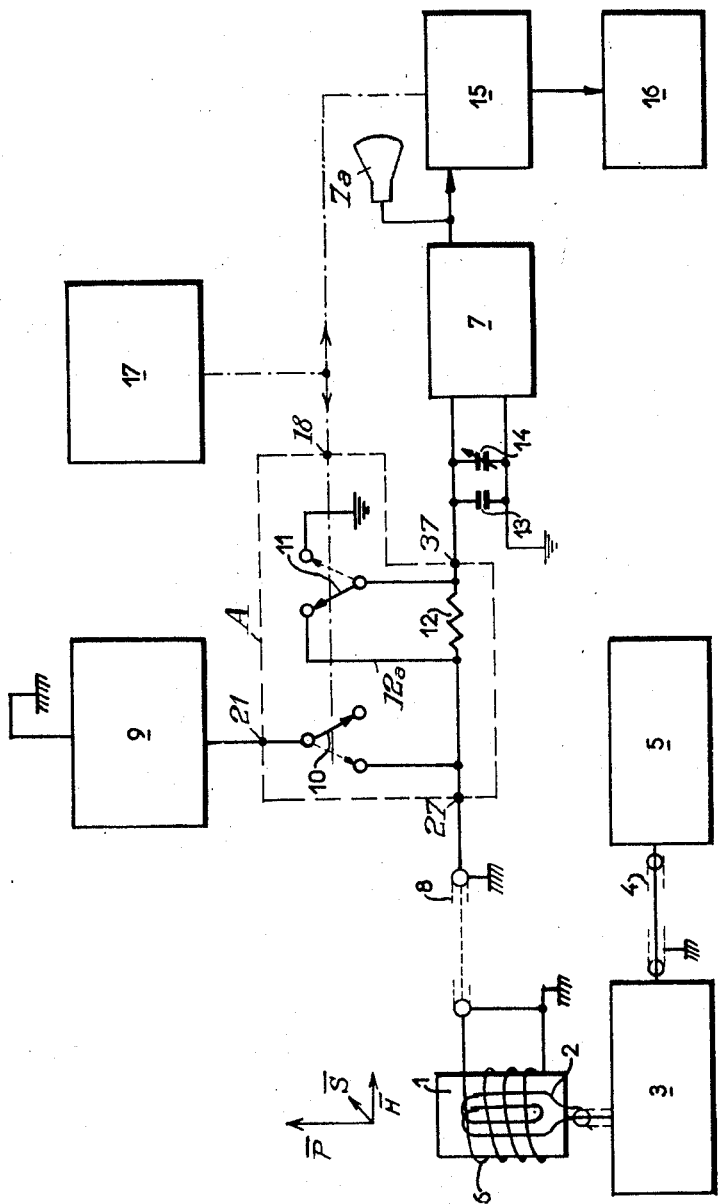
FIG. 1 is a block diagram of an embodiment of a nuclear induction magnetometer made according to this invention.

With reference first to FIG. 1, a magnetometer according to the invention comprises the following elements:

(1) A vessel 1 of 100 cubic centimeters, filled with water (this liquid containing protons, the frequency of nuclear resonance of which in the earth's magnetic field is of the order of 2000 cycles per second) in which has been dissolved, as paramagnetic substance having a spectrum of hyperfine structure, potassium nitrosodisulfonate, also called disulfonate of peroxylamine and of potassium, $(SO_3)_2NOK_2$ to form a solution of 1 gram of nitrosodisulfonate per liter;

(2) Means for saturating an electronic resonance line of this nitrosodisulfonate in the magnetic field forming the resultant of the small field $\overline{H}$ to be measured and of the polarizing field $\overline{P}$ (of the order of from one to ten times, for instance from two to six times, the field to be measured) the frequency of this line being 55.8 megacycles per second when the field to be measured is the earth field and the polarizing field is of a value ranging from 1 to 3 gauss and varies very little when the field to be measured and consequently the total field remains small (for instance lower than 10 gauss), these means comprising:

A high frequency coil 2 consisting of a small number, for instance four, turns of a thick wire disposed in such manner that the high frequency alternating field $\overline{S}$ that they produce is directed along a straight line making an angle, preferably of 90°, with the magnetic field $\overline{H}$ to be measured (the axis of the turns of coil 2 being in this case at right angles to $\overline{H}$), A high frequency generator 5 of a conventional type supplying oscillations at the frequency of 55.8 megacycles per second with a power of 6 watts; it will be noted that the frequency stability of this oscillator and the adjustability of its frequency do not constitute problems because, on the one hand, the electronic resonance lines or bands are very wide and, on the other hand, when the field is small (which is the case with the earth magnetic field and with the polarizing fields that are used) the electronic resonance frequency is independent of the field, A coaxial cable 4 and a matching network 3 (comprising for instance one or several adjustable capacitors) to match the impedance of generator 5 to that of coil 2; the attenuation in cable 4 being two decibels, the power available at the input of coil 2 is more than three watts;

System 2, 3, 4, 5 permits of saturating the electronic resonance line of nitrosodisulfonate in a weak magnetic field and consequently of polarizing, from the point of view of intensity, through the Overhauser-Abragam effect, the protons of the mass of water in which the nitrosodisulfonate is dissolved;

(3) A coil 6 serving both to create the auxiliary polarizing field $\overline{P}$, which must make an angle preferably equal to 90° with field $\overline{H}$, and to collect the signal of free precession, about direction $\overline{H}$, of the protons of the solution contained in vessel 1, this coil consisting of a multiplicity of turns (four sections of 1200 turns) of enamelled wire of 40/100 of a millimeter; this coil 6 which has an inductance of 1 henry and a Q-factor of 50 (at the above indicated resonance frequency) being connected to a switching device A through a coaxial cable 8 the distributed capacity of which is 30 picofarads per meter and the length of which is for instance equal to 30 meters (total capacity 0.9 microfarad); this cable has for an object to prevent the currents produced in the hereinunder described units from producing nonnegligible disturbing magnetic fields inside vessel 1;

(4) A direct current generator or source 9 of a conventional type capable of supplying the coil, through the contact 10 of the switching device A, with a unidirectional current which increases, essentially due to the inductance of coil 6, from zero to 1.5 ma. within a little more than 0.125 millisecond (i.e., a little more than one fourth of the Larmor periods of protons, which, in the earth field, is 0.5 ms.); this generator serves to polarize in direction the protons of the mass of water present in vessel 1 by aligning their macroscopic magnetization $\overline{M}$ along $\overline{R}=\overline{P}+\overline{H}$);

(5) A resistor 12, of 39 kiloohms capable, between the sudden stopping of the feed of current to coil 6 by generator 9 and the beginning of the period of measurement of the electromotive force induced in coil 6 at Lamor frequency in the field $\overline{H}$ to be measured, of dissipating the electric energy present in coil 6; this resistor 12 may be either connected to coil 6 (when the switch 11 of switching device A is in the dotted lines position) or short-circuited by conductor 12a (when the switch 11 is in the solid lines position);

(6) A system for determining the frequency of the electromotive force induced in coil 6 by the free precession of the protons of vessel 1 polarized in direction by fields $\overline{P}$ and in magnitude by field $\overline{S}$, which precession takes place at the Larmor frequency in the field to be measured, this system comprising:

Capacitors (to wit a fixed capacitor 13 and an adjustable capacitor 14) for tuning coil 6, the shunt arrangement of capacitors 13 and 14 constituting together with coil 6 and coaxial cable 8, when resistor 12 is short-circuited, an oscillating circuit which may be tuned by means of capacitor 14 to the nuclear resonance frequency of protons in the field to be measured;

A low frequency amplifier 7 (about 2000 cycles per second in the case of measurement of the earth's magnetic field) connected across the terminals of the above mentioned oscillating circuit 6, 8, 13, 14 to amplify the oscillations at the Larmor frequency induced in coil 6 by the free precession of the protons; this amplifier advantageously consists, in a known manner, of a pre-amplifier stage and of one or several selective and adjustable bandpass amplifier stages corresponding for instance to 50, 100, 200 or 400 cycles per second, that is to say 1250, 2500, 5000 and 10,000 gammas (the gamma being a magnetic field unit used in geophysical prospection and equal to $10^{-5}$ gauss), the preamplifier and amplifier stage being mounted on anti-microphonic dampers and producing an adjustable amplification by steps of 10 decibels from 0 to 100 decibels (the noise level at the input is of the order of magnitude of the microvolt), An oscilloscope 7a which permits of observing the amplified signal available at the output of amplifier 7, A frequency meter 15, of a known type, capable of measuring with a high accuracy the frequency of the amplified oscillations supplied by amplifier 7, this frequency meter 15 comprising the following elements:

(a) A unit capable of delivering a voltage step signal (step V of FIG. 2) of a duration equal to a given number (possibly adjustable as a function of the accuracy and rapidity of measurement as hereinafter explained with reference to FIG. 3) of Larmor periods of the signal of free precession of the protons (for instance 500, 1000, 2000 or 4000 periods), this duration being of the order of magnitude of one second, (b) A very stable oscillator (or a radio receiver receiving a very stable wave from a transmitting station) capable of supplying trains of reference oscillations of well determined frequency, for instance of the order of one megacycle per second in order to have a good accuracy, (c) a counter (for instance of the type manufactured by Hewlett-Packard Company, Palo Alto, California) started by the leading edge of said step and stopped by the trailing edge thereof, said counter counting the number of oscillations delivered by said oscillator during the length of said voltage step signal (such a device 15 being for instance described in the above-mentioned U.S. Patent No. 2,561,490 with reference to FIGS. 9 to 12 thereof), An analog or digital recorder 16 which records the successive results of the measurements or determinations made by frequency meter 15 either in the form of successive points or in the form of the last three figures of the number determined by the counter of the frequency meter;

(7) A switching device A (two preferred embodiments of which will be hereinafter described with reference to FIGS. 4 and 5 respectively) which comprises, in addition to switch 10 and to reversing switch 11 (which have been shown in solid lines in their off positions), electronic control means for these elements and which is in turn controlled by a clock 17 (which also controls the cycle of device 15) sending at regular time intervals a short control pulse which starts every cycle of operation.

Each of these cycles comprises:

(a) A period of polarization of the protons in direction and intensity, at the beginning of which clock 17 controls switch 10 to close it and reversing switch 11 to bring it into the position shown in dotted lines; during this period generator 9 sends through coil 6 a current passing from zero to 1.5 ma. in a little more than 0.125 ms. (millisecond), producing inside vessel 1 a polarizing magnetic field $\overline{P}$ substantially perpendicular to the field $\overline{H}$ to be measured and increasing to 1.5 gauss in a little more than 0.125 ms.; at the end of this first period the protons of the mass of water contained in vessel 1 have undergone a macroscopic magnetization $\overline{M}$ in the direction of the total field $\overline{R}=\overline{P}+\overline{H}$, but multiplied (as concerns the strength thereof) with respect to the nuclear polarization of this field by a considerable factor due to the Overhauser-Abragam effect, because generator 5 performs at the same time, through coil 2, a saturation of an electronic line of the nitrosodisulfonate dissolved in water; obviously the duration of this period must be at least equal to the minimum time necessary for an effective polarization of the protons under the effect of the polarizing field and the saturation field (this minimum duration averaging 0.125 ms. in the above example), but it may be longer and/or it may be followed by a period during which these two fields are simultaneously maintained; but longer durations of this period, which have no advantage from the point of view of accuracy of measurement, reduce the repetition rate of the cycles, which is not advantageous; it is therefore of interest to make the duration of this polarizing period as short as possible for instance as low as from 0.25 to 0.5 times the Larmor period (in the case of protons in the earth's magnetic field, this polarizing period advantageously averages one millisecond);

(b) a period for very quick cancellation of the polarizing field $\overline{P}$ and dissipation or damping of the oscillatory discharge or unloading of coil 6, this period beginning with the opening of switch 10 and ending with the reversing of switch 11 from the position in dotted lines to the position in solid lines under control of clock 17;

The rapidity of cut off being determined chiefly by the form of the discharge of coil 6 it is advantageous to have an oscillatory discharge and in order to have the frequency of the oscillations of the coil sufficiently high, tuning capacitors 13 and 14 are short-circuited when the field is to be cancelled (switch 11 being in the position shown in dotted lines); otherwise these capacitors would reduce this frequency; the frequency of the discharge is then determined by the inductance (1 henry) of coil 6 and of the parasitic capacity (900 picofarads) of coaxial cable 8 which should be made as low as possible to increase this frequency; with the values given by way of example, the duration of the cut off period is 42 microseconds (this duration might be reduced by making use of a shorter coaxial cable 8, which is possible if the magnetic fields created on the right hand of this cable, when considering FIGURE 1, do not disturb the measurement);

The oscillatory discharge or unloading must be damped before coil 6 is connected to amplifier 7 so that the nuclear oscillations be not masked by the oscillatory discharge of coil 6 and so as to protect this amplifier; it is therefore of interest to reduce the time constant of oscillating or resonant circuit 6, 8 during this discharge by introducing thereinto, at the time of cut off, damping resistor 12 which reduces the Q-factor of the oscillating circuit and adjusts this circuit slightly above its critical value;

(c) a period of measurement proper or of determination of the nuclear Larmor frequency, which period lasts from 1 to 3 seconds; switch 10 being then open, reversing switch 11 is returned into the position in solid lines when the oscillatory discharge is damped and it connects coil 6 with capacitors 13, 14, thereby establishing an oscillating circuit 6, 8, 13, 14 tuned to the nuclear resonance (or Larmor) frequency of the protons in field $\overline{H}$ (about 2000 cycles per second in the case of the earth field), and to amplifier 7, while short-circuiting resistor 12; device 15 then determines the frequency of the nuclear precession oscillations amplified by amplifier 7 and recorder 16 records the result of this determination.

Figure 2:
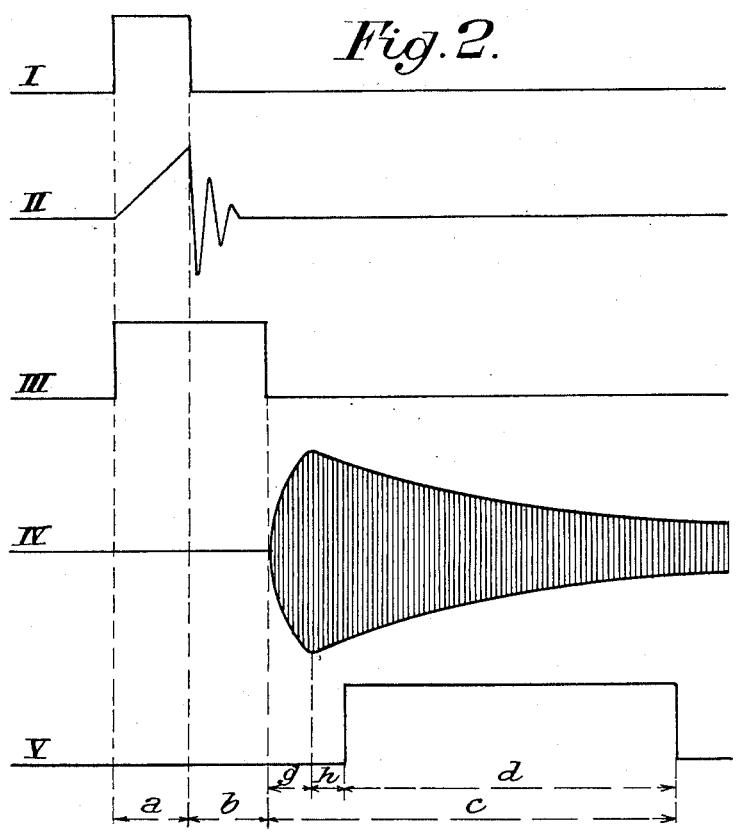
FIG. 2 shows the variations, during a measurement cycle, of the signals for controlling the switching means and of the signals available at the terminal of the polarizing coil (which serves also to collect the free precession oscillations)

FIG. 2 (wherein the amplitudes are plotted against the times) shows different signals produced during the successive periods of the cycle of operation.

Curve I shows the signal for controlling switch 10, which signal is supplied by clock 17; this signal appears at the beginning of every cycle and starts the polarization period. It is supplied by clock 17 for instance during approximately 10 ms. when control is performed (as hereinafter described with reference to FIG. 4) by means of a relay the winding of which (10a, FIG. 4) is energized by signal I and the contact of which constitutes switch 10. In view of the inertia of the relays this time is much longer than the minimum time (averaging 0.125 ms.) necessary to obtain an increase of the current flowing through coil 6 sufficiently slow to ensure a suitable aligning of $\overline{H}$ in the direction of $\overline{R}$.

Curve II illustrates the variations of current in coil 6 at least before the nuclear precession signal develops: the first portion of this curve represents the substantially linear rise of the polarization current whereas the second portion represents the oscillatory discharge, damped by resistor 12, which takes place when contact 10 is open.

Curve III illustrates the signal for controlling reversing switch 11, to shift it from the off position (in solid lines) to the on position (in dotted lines) also in the case where control thereof is effected by means of a relay the winding of which (such as 11a, FIG. 4) is energized by signal III and the contact of which constitutes reversing switch 11. This signal III, which begins at the same time as signal I, ends 0.5 ms. later (since it is necessary to let the oscillatory discharge be damped before sending any signal to amplifier 7).

Curve IV shows the electric potential or voltage at the input of amplifier 7 during the measurement period proper. This signal is an alternating one at the nuclear Larmor frequency (about 2000 cycles per second for protons in the earth's magnetic field), its envelope being shown in thick lines. It will be noted that the nuclear signal does not instantaneously reach its maximum value, the time constant of its increase being practically that of the oscillating or resonant circuit 6, 8, 13, 14 the inductive element of which is coil 6 (that is to say some milliseconds). It is only when this maximum value is reached that the reference oscillations are counted in device 15. Furthermore, as this counting must start at the beginning of an oscillation at the Larmor frequency, it is necessary to provide this device 15 with phasing means (these means may for instance be similar to those described in the above mentioned U.S. Patent No. 2,561,490 or they may comprise means for controlling the passage through zero of the amplitude of the nuclear oscillations, to start counting at the time of this passage). The delay $g$ introduced as a consequence of the increase period is for instance approximately 20 ms. whereas the delay $h$ produced by phasing operation is about 2 ms.

Finally curve V represents the counting signal, that is to say the signal the leading edge of which causes the reference oscillations to begin to be counted and the trailing edge of which stops this counting in device 15, the duration $d$ of signal V being equal to that of a well determined, but possibly adjustable integral number of Larmor nuclear periods, that is to say being proportional to this period and therefore inversely proportional to field strength H for a given adjustment.

It is not possible considerably to reduce the duration $d$ of signal V without reducing too much the accuracy of measurement of the magnetic field. As a matter of fact, there is an indeterminacy, which cannot be reduced through purely electronic methods, concerning the phase of the free precession signal and this indeterminacy is inversely proportional to the signal to noise ratio at the output of coil 6 which collects the free precession signal. An error is therefore made at the opening and at the closing of measurement device 15 and in particular of the reference oscillation counter. The relative error which results therefrom in the measurement of the magnetic field would be inversely proportional to the number of reference periods counted if the signal to noise ratio remained constant. But two reasons prevent an indefinite increase of this number:

The first one, already stated, is that it is of interest to increase the rate of repetition of the measurements so as to be able to follow quick variations of the magnetic field that is measured in particular in the case of geophysical prospection from an aircraft;

The second reason is due to the fact that the signal of free precession of the nuclear spins is exponentially damped (with a time constant generally called the spin-spin relaxation time $T_2$) due to the gradual loss of initial phase cohesion between the nuclear spins; the signal to noise ratio therefore decreases and reaches non acceptable values after a time averaging three times the relaxation period of the nuclear spins that is to say three seconds in the example; as a matter of fact it is this effect which made it impossible to increase accuracy by increasing the duration of measurement of the Larmor frequency in magnetometers made according to the prior art.

Therefore the choice of the duration of counting (duration of signal V) depends upon circumstances:

When it is desired to have a sensitivity as high as possible, choice is made of a duration of counting close to the time constant of decrease of the free precession signal;

But when it is desired to be able to follow quick variations of the magnetic field (during prospection from an aircraft for instance) and when a relatively low accuracy is admissible, the duration of measurement (duration of V) is chosen of lower value although it can hardly be lower than one fourth of the above mentioned time constant $T_2$. The rate at which successive measurements follow each other is thus increased. Furthermore, in this case, it is of interest to reduce this time constant by increasing the concentration in paramagnetic ions of the solution that is used. As a matter of fact the amplitude of the nuclear precession signal at the beginning of every counting period is reduced by the "phase memory" phenomenon due to the fact that when the macroscopic nuclear magnetic moment $\overline{M}$ is not yet re-aligned on the permanent field $\overline{H}$ to be measured, its position with respect to the auxiliary polarizing field $\overline{P}$, when this latter is created, is uncertain; this reduction is greater as the intensity of this signal is higher at the end of the frequency measurement period. It averages 15% when the time between two applications of the biasing field is equal to the time constant of decrease of the precession signal and it reaches 50% when this time is equal to one fourth of this time constant.

Figure 3:
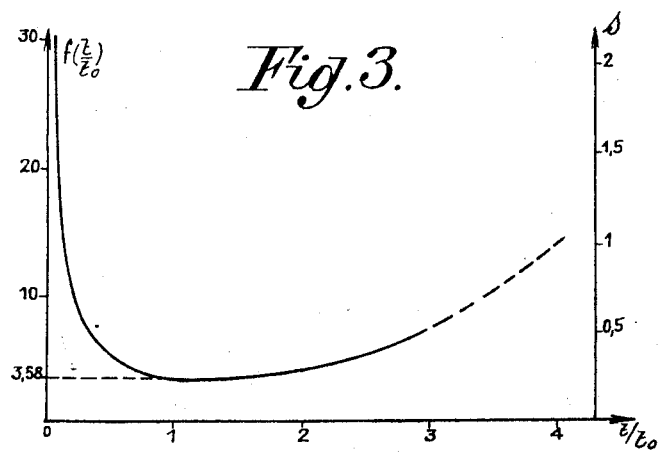
FIG. 3 illustrates the variation of sensitivity of the magnetometer of FIG. 1 as a function of the duration of the period of measurement of the Larmor frequency.

FIG. 3 shows a curve obtained by plotting in abscissas the ratio $t/t_0$ of the counting time $t$ to the time constant $t_0$ of decrease of the nuclear precession signal and in ordinates on the left a function $$f\left(\frac{t}{t_0}\right)$$

such that the absolute sensitivity $s$ is given by the following formula:

$$s = \frac{1}{wr_0 t_0} f\left(\frac{t}{t_0}\right) H$$

in which $w$ is the Larmor angular frequency, $r_0$ the initial signal to noise ratio, and H the strength of the field $\overline{H}$ to be measured. The curve is established without taking into account the reduction of the initial amplitude of the precession signal due to the above mentioned "phase memory" phenomenon. The scale of ordinates shown on the right gives the value of $s$ in gammas for an initial signal to noise ratio $r_0=50$, $t_0$ being equal to 1 and H having a value equal to 50,000 gammas, these values having been measured when the frequency range of amplifier 7 was 400 cycles per second, which corresponds to 10,000 gammas.

Figure 4:
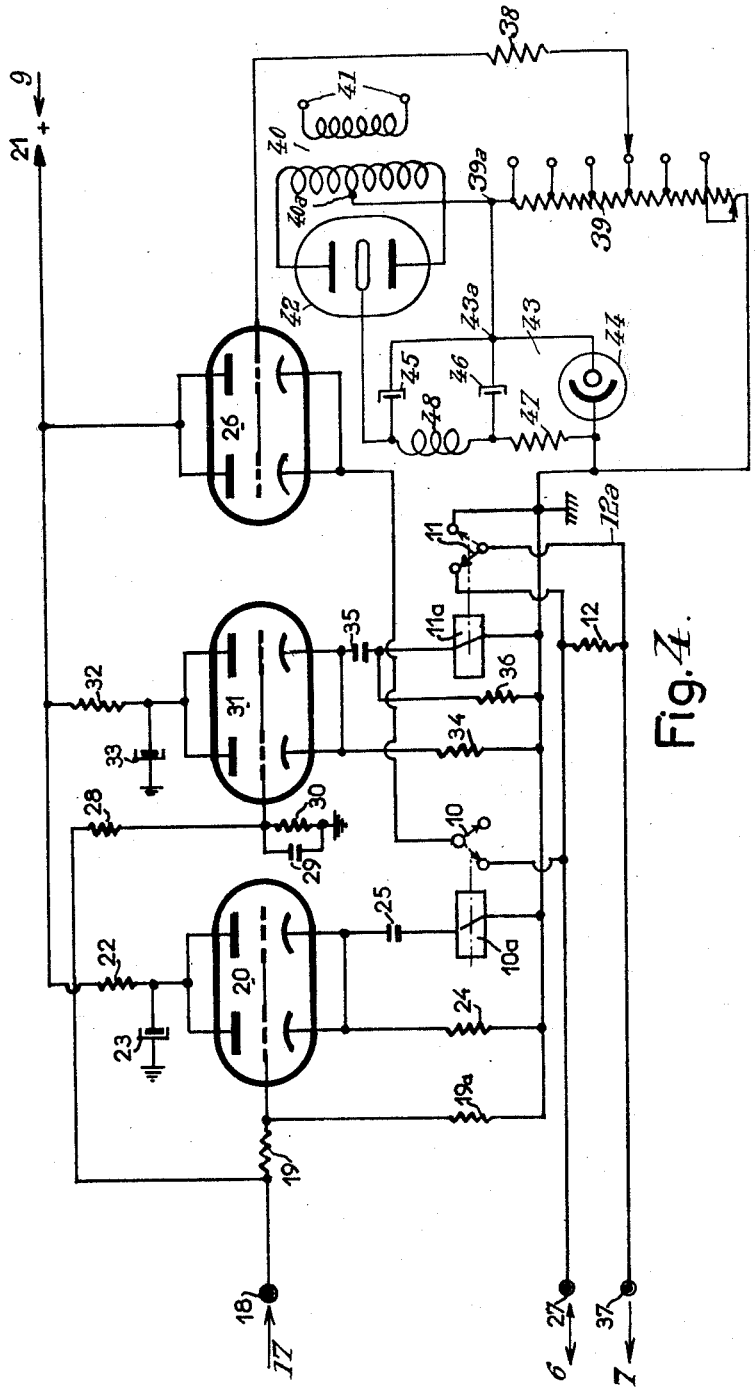
FIG. 4 shows a first embodiment of the switching means provided between the polarizing and oscillation collecting coil, on the one hand, and the direct current source, the element for dissipating the electric energy in the coil, the amplifying means and the means for counting the oscillations induced in the coil, on the other hand.
Figure 5:
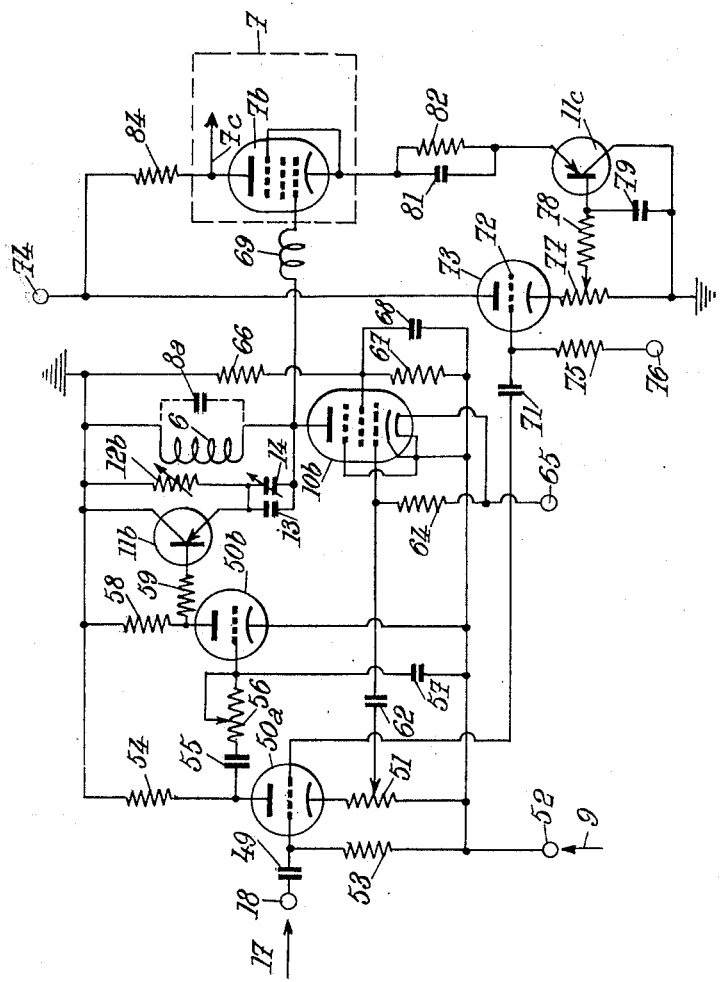
FIG. 5 shows a second embodiment of such switching means.

We will now describe, with reference to FIGS. 4 and 5 respectively, an embodiment making use of relays (using signal I and III of FIG. 2) and an entirely electronic embodiment of the switching device A of FIG. 1.

In the embodiment of FIG. 4, clock 17 sends to input terminal 18 signal I (FIG 2) having a duration of ten milliseconds and an amplitude of twenty volts at the beginning of every cycle of operation, for instance on every second. This pulse I first acts through a resistor 19 (a resistor 19a being provided for uncoupling) on the grids of a double triode 20 the anodes of which are fed with current from a terminal 21 (connected to source 3) through a filter system including a resistor 22 and a capacitor 23. Pulse I rends conductive tube 20 which comprises, in shunt, in the circuit of its cathodes, on the one hand a resistor 24 and on the other hand a winding 10a actuating the normally open switch or contact 10 (position shown in solid lines), this winding 10a being protected by a capacitor 25 in series therewith.

Winding 10a is fed with current and consequently contact 10 is closed (position in dotted lines) during the whole duration of pulse I (polarization period $a$). As long as contact 10 is closed, terminal 27 (to which coil 6 is connected through coaxial cable 8 as shown by FIG. 1) is fed with current through the double triode 26 also fed with current from terminal 21 and the grid biasing of which is adjusted, as shown, by a resistor 38 and a potentiometer 39, the ungrounded terminal 39a of this potentiometer being connected on the one hand to the middle point 40a of the feed transformer 40 (fed from an A.C. source 41) of a full-wave rectifier tube 42 and on the other hand to the point 43a of a network 43 (consisting of a voltage regulating tube 44, of two capacitors 45, 46, of a resistor 47 and of a filtering coil 48) inserted between ground and the cathode of tube 42.

At the end of pulse I contact 10 is opened, thereby cutting off the polarizing current flowing toward coil 6.

Pulse I, applied to input terminal 18, also acts, through a resistor 28 and a pulse lengthening circuit consisting of a capacitor 29 and a resistor 30, on the grids of a double triode 31 similar to tubes 20 and 26 and the anodes of which are fed with current through a resistor 32 and a capacitor 33. The circuit of the cathodes of tube 31 is analogous to that of the cathodes of tube 20 and comprises, arranged in shunt, on the one hand a resistor 34 and on the other hand a winding 11a (actuating contact 11 the off-position of which is shown in solid lines) protected by a series mounted capacitor 35 and shunted by a resistor 36.

As long as tube 31 is conductive, that is to say as long as pulse III (resulting from the lengthening of pulse I by circuit 29, 30) leaves this tube conductive, winding 11a is fed with current and consequently contact 11 is brought into the dotted lines position where terminal 37 (to which the whole of capacitors 13, 14 and of amplifier 7, shown by FIG. 1, is connected) is grounded, which enables, during period $b$ (FIG. 2) for which contact 10 is open, coil 6 to be discharged through resistor 12, which is not short-circuited by conductor 12a along the oscillating portion of signal II of FIG. 2.

At the end of signal III, switch element 11 comes back to its position shown in dotted lines, thereby connecting, during the whole of period $c$, coil 6 (connected to terminal 27) to capacitors 13, 14 and to amplifier 7 (connected to terminal 37), and amplifier 7 receives a signal of the type shown at IV, FIG. 2, the measurement of its frequency being made during the occurrence of signal V. The cycle of periods $a$, $b$, and $c$ starts with a new pulse I after the end of the preceding measurement period.

The elements illustrated by FIG. 4 may correspond to the following data.

Resistances in kiloohms:

| | |
|---|---|
| 19 | 100 |
| 19a | 220 |
| 22 | 1 |
| 24 | 10 |
| 38 | 100 |
| 39 | 28.8–0 |
| 47 | 15 |
| 28 | 120 |
| 30 | 330 |
| 32 | 1 |
| 34 | 10 |
| 36 | 100 |

Feed in volts:

| | |
|---|---|
| 21 | +250 |
| 41 | 6.5 |

Capacities in microfarads:

| | |
|---|---|
| 23 | 16 |
| 25 | 2.5 |
| 45 | 16 |
| 46 | 16 |
| 29 | 5 |
| 33 | 16 |
| 35 | 14 |

Electronic tubes:

| | |
|---|---|
| 20 | 12AU7 |
| 26 | 12AU7 |
| 42 | 6X4 |
| 44 | 85A2 |
| 31 | 12AU7 |

It is possible to reduce the duration of periods $a$ and $b$ by making use of a purely electronic switching as illustrated by FIG. 5.

The input terminal 18 of the switching device of FIG. 5 is connected, same as the terminal 18 of FIG. 4 with clock 17 so as to receive therefrom, at regular intervals (for instance on every second) a short control pulse. However, due to the fact that switching is entirely electronic in this case, the control pulses have an amplitude of 5 volts and a duration of 0.1 ms. (instead of 20 volts and 10 ms.).

Every pulse is fed through capacitor 49 to the grid of the first portion 50a of a double electronic tube 50a—50b. The cathode of portion 50a is connected through potentiometer 51 to a current source (source 9 of FIG. 1) which keeps terminal 52 at a negative potential. Biasing of the grid of portion 50a is ensured by a resistor 53. As for the corresponding anode, it is grounded through a load resistor 54. The signal produced on this anode is transmitted through coupling capacitor 55 to a signal lengthening circuit consisting of a potentiometer 56 and a capacitor 57. The elongated signal is then applied to the grid of the other portion 50b of the same tube, in the anode circuit of which there is inserted a load resistor 58. The signal collected on this anode is transmitted through a resistor 59 to the base of a transistor 11b.

This transistor is therefore blocked during the duration of the input pulse and the duration of the elongation by circuit 56, 57. The emitter of transistor 11b is connected through tuning capacitors 13 and 14 to the measurement coil 6 surrounding vessel 1 which contains the liquid sample the nuclear precession signal of which is used. In shunt with transistor 11b there is placed an adjustable damping resistor 12b (which plays the same part as the fixed resistor 12 of FIGS. 1 and 4). In shunt with coil 6 is shown in dotted lines the virtual capacitor 8a, equivalent to the parasitic capacity of the coaxial cable 8 which connects coil 6 with units 7, 17 for data processing of the nuclear precession signal (FIG. 1).

When transistor 11b is blocked, a damped oscillating discharge may take place in the circuit consisting of coil 6 and capacitor 8a at the natural frequency of this circuit (this frequency is much higher than the nuclear Larmor frequency which is necessary to obtain that the cutting off of the auxiliary field is sufficiently quick). As a matter of fact capacitors 13, 14 have at this frequency a sufficiently low impedance to make the impedance that they constitute together with resistor 12b purely resistive for practical purposes. On the contrary when transistor 11b becomes conductive its internal resistance is negligible, which eliminates the effect of the damping resistor 12b and places tuning capacitors 13 and 14 in shunt with coil 6, the circuit being again tuned to the nuclear Larmor frequency.

From potentiometer 51 there is collected a signal which is transmitted through a capacitor 62 to the control grid of a tube 10b. This tube delivers, when it is conductive, the current intended to control the auxiliary magnetic field in coil 6. The control grid of tube 10b is biased by a resistor 64 connected with terminal 65 kept at a negative potential, which also serves for the heating of the cathode of tube 10b.

The potential of the screen grid of tube 10b is adjusted by the bridge constituted by resistors 66, 67, resistor 67 being connected in shunt with capacitor 68. During the input pulse, tube 10b is conductive and causes an increasing current to flow through coil 6.

At the end of this pulse, tube 10b is blocked and the oscillations in coil 6 are damped until transistor 11b is unblocked. The residual current in tube 10b is negligible and does not disturb the magnetic field to be measured during the measurement period. The nuclear precession signal which then appears across the terminals of coil 6 is applied through reactance coil 69 to the control grid of tube 76 which constitutes the pre-amplifier stage of the amplifier 7. The signal intended to be amplified subsequently is collected (arrow 7c) in the anode circuit of tube 7b, this circuit comprising a load resistor 84. The screen grid of tube 7b is biased through means not shown.

At the input of the grid of the half or portion 50a of the double tube there is connected, through capacitor 71, the control grid 72 of a second tube 73 the anode of which is fed with current through terminal 74. This grid 72 is biased through resistor 75 connected to the negative terminal 76. In the cathode circuit of this tube 73, arranged as a cathode-follower, there is placed an adjustment potentiometer 77 from which is collected a signal similar in time and in sign to the input pulse. This signal is elongated or lengthened by a circuit comprising a resistor 78 and a capacitor 79. Then it is applied to the base of transistor 11c, which is thus blocked for a time longer than the length of the input pulse. The emitter of this transistor is connected to the cathode of tube 7b through a capacitor 81 and a resistor 82.

During the blocking of transistor 11c the resistance in the cathode circuit of tube 7b is much higher than the resistance of resistor 84. The potential of the cathode of the tube therefore practically follows that of the control grid and the signal collected at 7c is practically zero. The delay to unblocking of transistor 11c is determined by circuit 78, 79 so that the nuclear precession signal is amplified only when the oscillating discharge of coil 6 has been damped and when this signal has reached a sufficient amplitude (see FIG. 2). During this blocking, that is to say during the time of measurement, the internal resistance of transistor 11c drops to a negligible value (3 ohms) and tube 7b amplifies normally.

It will be seen that in this construction switching is purely electronic (tube 10b playing the part of the relay 10, 10a of FIG. 4 whereas transistors 11b and 11c play the part of relay 11, 11a) and much quicker. In the embodiment of FIG. 5 the elements may have the following values:

Resistance in kilohms:

| | |
|---|---|
| 51 | 0–50 |
| 54 | 50 |
| 56 | 0–100 |
| 58 | 10 |
| 59 | 56 |
| 12b | 0–100 |
| 10 | 1000 |
| 66 | 100 |
| 67 | 100 |
| 75 | 1000 |
| 77 | 0–10 |
| 78 | 56 |
| 52 | 1 |
| 84 | 100 |

Capacities in microfarads:

| | |
|---|---|
| 49 | 2 |
| 55 | 2 |
| 57 | 0.1 |
| 13 | 4.700 |
| 14 | 1.000 |
| 62 | 2 |
| 68 | 0.1 |
| 71 | 2 |
| 79 | 0.1 |
| 81 | 50 |

Tubes and transistors:

| | |
|---|---|
| 50a—50b | 12AU7 |
| 11b | SFT128 |
| 10b | EF80 |
| 7b | EF86 |
| 73 | 12AU7 |
| 11c | SFT123 |

Feed in volts:

| | |
|---|---|
| 52 | −100 |
| 65 | −106 |
| 74 | +150 |
| 76 | −6 |

It will be seen that the present invention leads to a magnetometer for the measurement of the absolute value of weak magnetic fields and in particular of the earth magnetic field, having, among others, the following advantages:

Its volume is small and it is strong and easy to adjust.

The consumption of energy is low.

The absolute accuracy and the relative accuracy are very high.

It permits measurements at a very high rate of repetition for instance one on every second or one on every second second.

A magnetometer according to the invention is particularly suitable for geophysical prospection from an aircraft or from an automobile vehicle to detect ores or hydrocarbons present in the ground.

We may use as liquid sample:

Potassium or sodium nitrosodisulfonate dissolved in water, pyridine or formamide;

Diphenyl-picrylhydrazyl, dissolved in benzene or in other organic products;

Tetraphenylstibonium nitrosodisulfonate dissolved in ether;

Picryl-aminocarbazyl dissolved in benzene;

Ions of a semiquinone, such as $(O=C_6H_4-O)^-$, dissolved in water.

In a general manner, while we have, in the above description, disclosed what we deem to be a practical and efficient embodiment of our invention, it should be well understood that we do not wish to be limited thereto as there might be changes made in the arrangement, disposition and form of the parts without departing from the spirit of the present invention as comprehended within the scope of the accompanying claims.

What we claim is:

1. A device for measuring the intensity of a weak magnetic field which comprises, in combination, a vessel, in said vessel a solution where the solvent contains a multiplicity of atomic nuclei having a definite gyromagnetic ratio different from zero and the solute contains paramagnetic ions with an unpaired electron having an electronic resonance line different from zero in a zero field and saturable in a high frequency alternating field, means for producing in said vessel an alternating field at the frequency of said line, a coil disposed about said vessel to be arranged in use with its axis making a substantial angle to the direction of the magnetic field to be measured, a source of direct current for supplying current to said coil, said source being capable when connected with said coil, of producing in said solution an auxiliary magnetic field of a direction making in use a substantial angle to the direction of the magnetic field to be measured and of an intensity having the same order of magnitude as that of the magnetic field to be measured, means adapted to be connected with said coil for dissipating the energy produced when the supply of current to said coil is ceased, means adapted to be connected with said coil for determining the nuclear Larmor frequency of the alternating electromotive force induced in said coil by a free precession motion of said atomic nuclei in the field to be measured, switching means for connecting said coil first with said source, then quickly with said energy dissipating means and then to said frequency determining means, and control means for operating said switching means to have said coil connected with said current source for a time of the order of magnitude of the period of said free precession motion, said period being equal to the reciprocal of said nuclear Larmor frequency, said switching means and said control means comprising a clock for delivering short pulses at regular intervals, a first electromagnetic relay having a winding adapted to be energized in response to each of said pulses and also having a contact adapted to connect, when in on-position, said coil with said current source, a circuit for lengthening the duration of each of said pulses to give lengthened signals at the same regular intervals, and a second electromagnetic relay having a winding adapted to be fed in response to each of said lengthened signals and also having a contact adapted to connect, when in off-position, said coil with said frequency determining means while short-circuiting said energy dissipating means, said last mentioned contact being adapted, when in on-position, to ground said coil while connecting said energy dissipating means with said coil.

2. A device for measuring the intensity of a weak magnetic field which comprises, in combination, a vessel, in said vessel a solution where the solvent contains a multiplicity of atomic nuclei having a definite gyromagnetic ratio different from zero and the solute contains paramagnetic ions with an unpaired electron having an electronic resonance line different from zero in a zero field and saturable in a high frequency alternating field, means for producing in said vessel an alternating field at the frequency of said line, a coil disposed about said vessel to be arranged in use with its axis making a substantial angle to the direction of the magnetic field to be measured, a source of direct current for supplying current to said coil, said source being capable, when connected with said coil, of producing in said solution an auxiliary magnetic field of a direction making in use a substantial angle to the direction of the magnetic field to be measured and of an intensity having the same order of magnitude as that of the magnetic field to be measured, means adapted to be connected with said coil for dissipating the energy produced when the supply of current to said coil is ceased, means adapted to be connected with said coil for determining the nuclear Larmor frequency of the alternating electromotive force induced in said coil by a free precession motion of said atomic nuclei in the field to be measured, switching means for connecting said coil first with said source, then quickly with said energy dissipating means, and control means for operating said switching means to have said coil connected with said current source for a time of the order of magnitude of the period of said free precession motion, said period being equal to the reciprocal of said nuclear Larmor frequency, said switching means and said control means comprising a clock adapted to deliver very short pulses at regular intervals, a first electronic switch normally blocked but adapted to be unblocked in response to each of said pulses and adapted to connect when it is unblocked said current source with said coil, at least one circuit adapted to increase the length of each of said pulses to give a lengthened signal repeated at the same regular intervals, a second electronic switch, normally unblocked but adapted to be blocked by a lengthened signal, mounted in shunt with said energy dissipating means, the whole of said second electronic switch and of said energy dissipating means being connected in series with said coil and with a tuning capacitive impedance to constitute, when said second switch is unblocked and short-circuits said energy dissipating means, a resonant circuit tuned to the frequency of the electromotive force induced in said coil by the precession of said atomic nuclei at the Larmor frequency and to branch, when said second switch is blocked, said energy dissipating means on said coil, a third electronic switch normally blocked but adapted to be unblocked by a lengthened signal, and a first preamplifier stage belonging to said frequency determining means connected in series with said third electronic switch.

3. A device according to claim 2 wherein said third electronic switch is a transistor, said first amplifier stage being an electronic tube having at least one cathode, a control grid connected with said resonant circuit and an anode, said transistor being mounted in the cathode circuit of said tube, a load resistor of low value as compared with the resistance of the transistor in the blocked state inserted in the anode circuit of said tube, the output of said stage toward the remainder of the frequency determining means being connected between said anode and said load resistor.

References Cited in the file of this patent

UNITED STATES PATENTS

| Re. 23,769 | Varian | Jan. 12, 1954 |
| 3,025,457 | Bloom | Mar. 13, 1962 |
| 3,058,053 | Bloom | Oct. 9, 1962 |

FOREIGN PATENTS

| 1,174,136 | France | Nov. 3, 1958 |

OTHER REFERENCES

Bennett et al.: Physical Review, vol. 108, No. 2, October 1957, pages 499 and 500.

Waters: Journal of Scientific Instruments, vol. 35, No. 3, March 1958, pp. 88 to 93 incl.

Solomon: Physical Review, vol. 99, No. 2, July 15, 1955, pages 559 to 565 incl.